United States Patent [19]

Brüggemann

[11] Patent Number: 5,493,291
[45] Date of Patent: Feb. 20, 1996

[54] APPARATUS FOR THE TRANSFER OF INFORMATION IN MOTOR VEHICLE TRAFFIC

[75] Inventor: Ulrich Brüggemann, Heustreu, Germany

[73] Assignee: Preh-Werke GmbH & Co. KG, Bad Neustadt, Germany

[21] Appl. No.: 218,173

[22] Filed: Mar. 28, 1994

[30] Foreign Application Priority Data

Mar. 31, 1993 [DE] Germany .......................... 43 10 531.9

[51] Int. Cl.$^6$ ..................................... G08G 1/09
[52] U.S. Cl. .................. 340/905; 340/941; 340/902; 340/904; 340/991; 340/992; 340/993; 340/996; 340/989; 340/825.54; 455/41; 455/54.1; 455/55.1; 455/99
[58] Field of Search ..................... 340/941, 902, 340/903, 904, 991, 992, 993, 996, 989, 825.54, 825.71; 455/41, 54, 55, 99

[56] References Cited

U.S. PATENT DOCUMENTS

| | | | |
|---|---|---|---|
| 3,775,743 | 11/1973 | Carter | 340/905 |
| 4,251,797 | 2/1981 | Bragas et al. | 340/905 |
| 4,962,457 | 10/1990 | Chen et al. | 364/443 |
| 5,198,811 | 3/1993 | Potter et al. | 340/905 |

FOREIGN PATENT DOCUMENTS

| | | |
|---|---|---|
| 0521846A1 | 1/1993 | European Pat. Off. . |
| 3018332A1 | 11/1980 | Germany . |
| 3345707A1 | 6/1985 | Germany . |
| 3438053C2 | 4/1986 | Germany . |
| 3636258A1 | 4/1988 | Germany . |
| 3911916A1 | 5/1990 | Germany . |
| 4003410C2 | 8/1991 | Germany . |

Primary Examiner—John K. Peng
Assistant Examiner—Daryl Christian Pope
Attorney, Agent, or Firm—Griffin, Butler Whisenhunt & Kurtossy

[57] ABSTRACT

In an apparatus for the transfer of information in motor vehicle traffic between a fixed-position transmitter-building element near a roadway and a receiver arranged in a vehicle, the transmitter-building element emits a coded information signal and the receiver of the vehicle driving past the transmitter-building element displays information from the information signal in the vehicle. In order to make shielding measures unnecessary, with an uncomplicated supply of energy to the transmitter-building element and small construction costs therefor, the transmitter-building element (1) is built into roadway pavement (12). The energy necessary for transmitting the information signal is received by the transmitter-building element (1) from the vehicle (13) which is driving above it. The receiver (4, 15, 16) has an antenna arrangement (14) which is arranged in a floor area of the vehicle (13) to transfer the necessary transmitting energy to the transmitter-building element (1) and receive the emitted information signal from the transmitter-building element (1).

6 Claims, 3 Drawing Sheets

APPARATUS FOR THE TRANSFER OF INFORMATION IN MOTOR VEHICLE TRAFFIC

BACKGROUND OF THE INVENTION

This invention concerns a device to transfer information in motor vehicle traffic between a transmitter-building element associated with a roadway and receivers arranged in motor vehicles of a type in which the transmitter-building element transmits a coded information signal and receivers in the motor vehicles receive and analyze the information signal.

An information system for use by vehicles in a roadway is described in German Offenlegungsschrift DE 36 36 258 A1. With this system, driver information concerning a particular stretch of roadway, for example a speed limit, is suggested to be clearly brought before the eyes of drivers in interiors of vehicles. To accomplish this, traffic indication transmitters are appropriately arranged whose transmitted signals are received and evaluated by vehicles driving past. It is disadvantageous that such transmitters require their own power supplies. Thus, such transmitters require continuous maintenance.

German Offenlegungsschrift DE 39 11 916 A1 describes a process to recognize traffic indications. The apparatus described therein works with a transmitter and a signal identification generator. Each of these is supplied with current by means of a solar generator with a charging regulator and auxiliary battery. In addition to the solar generator a wind generator can be provided. Such an apparatus is quite expensive. Further, structural signal shielding is necessary to guide an information signal to only one vehicle.

In European patent application EP 0 521 846 A1 a wireless signaling system for motor vehicles is described. Also here a dedicated power supply is described for a transmitter. Further, shielding from other vehicles is necessary.

In a publication by the firm AEG, Elektronische Identifikation, a transponder and a read-out device arranged therewith are described. In this device objects in which such transponders are mounted are moved past the read-out device in order to identify the objects. The transponder is provided with a coil to receive a changing magnetic field for creating a changing, or alternating, voltage. The changing voltage provides energy to an integrated circuit in the transponder. The integrated circuit contains a fixed-code in memory as well as logic and a control component. When activated by a magnetic changing field the transponder sends the stored, or memorized, fixed code as a digital code signal. The changing magnetic field is created by a sensing apparatus which is stationary.

In German patent DE 40 03 410 C2 transponders are described for marking, or identifying, animals, for automated production, for cashless payment, and for motor vehicle identification.

According to the state of the art, such transponders are built into a non-stationary part of an information transmittal system.

It is an object of this invention to provide apparatus of the type set forth in the opening paragraph above in which provision of energy to the transmitter-building element is uncomplicated, for which construction costs of the transmitter-building element are low, and for which it is not necessary to employ shielding measures for transmitting signals.

SUMMARY

According to principles of this invention, a transmitter-building element is built into pavement forming a roadway and loop antennas are arranged in floor areas of vehicles driving over the transmitter-building element for transmitting energy to the transmitter-building element.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
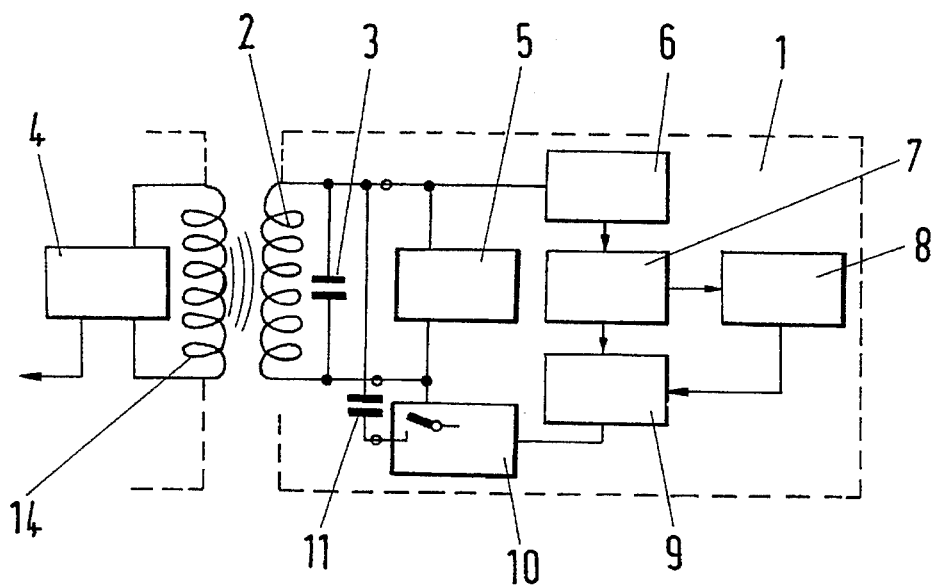
FIG. 1 is a partially schematic, partially block diagram of a transponder of this invention along with an antenna and read-out device.

A transponder 1 has a transmit-receive coil 2 with a condenser 3 connected in parallel therewith. A resonance frequency of this oscillating circuit is tuned to a transmitting frequency of a read-out device 4. This transmitting frequency lies under 150 KHz according to postal regulations of Germany as well as in those of other countries.

In the transponder 1, a voltage supply circuit 5 is arranged which is fed via the coil 2 from transmitted energy of the read-out device 4, and the entire circuit of the transponder 1 is supplied with energy therewith. The transponder 1 is provided with a clock circuit 6 and a sequence-control element 7 which addresses a memory 8. The memory 8 can be a ROM, PROM or a EEPROM. The memory 8 stores respectively necessary information data. The memory 8 is connected to the transmit-receive coil 2 via a data decoder 9 and a modulator 10 as well as a condenser 11. The oscillating circuit of the transponder 1, formed by the coil 2 and the condenser 3, is tuned by means of the parallel connected condenser 11. The read-out device 4 recognizes a changed resonance of the oscillating circuit 2, 3 and in this manner accepts coded data of the memory 8 sent by the transponder 1.

Alternatively, the transponder can be provided with two oscillating circuits having different resonance frequencies. Such a transponder distinguishes the received frequency, with which energy is transmitted from the readout device 4 to the transponder 1, from a transmission frequency of the transponder.

Other known transponders can be used in the described apparatus for transmitting information.

The transponder 1 is built into a driving-lane pavement 12 of a street as a building element, or part thereof. Because of the small size of the transponder 1, only a simple bore in roadway pavement 12 is necessary for this. The transponder 1 is mounted at a place in the roadway pavement which is usually driven over by vehicles 13 so that the transponder 1 is driven over by vehicles 13. For wide, multi-lane roadways, a plurality of transponders with the same information are built into roadway pavement in adjacent lanes for a driving direction. A spacing arrangement used for this prevents one from simultaneous driving over a plurality of transponders. A frame antenna, or a coil antenna, 14 is arranged in a floor of a vehicle 13 which is coupled to the read-out device 4 mounted in the vehicle 13.

The coil antenna 14 has, for example, a length in a driving direction of around 1.5 meters. At a maximum vehicle speed of 250 km/h, i.e., 70 m/s, the transponder 1 remains in an area of the coil antenna 14 around 21 ms. Assuming that the memory 8 is arranged to hold at least 32 bytes, or for a more expensive system 64 bytes, and that with each second complete wave of frequency of the transmission system a bit is transmitted, then it is necessary for the transmitter transmission frequency to be greater than 50 KHz. This lies in a range of known transponders for which transponder transmitting frequencies are around 64 KHz and read-out device transmission frequencies are around 128 KHz.

The read-out device 4 which is arranged in the vehicle 13 is coupled to an analyzing circuit 15 which controls a display, or indicating, device 16. An electrical voltage U which comes from the voltage supply of the vehicle 13 is applied to the analyzing circuit 15. Energy from the energy supply of the vehicle is transmitted, or transferred, through the read-out device 4 and the coil antenna 15 to the transponder 1.

Further, the analyzing circuit 15 receives additional vehicle data D, for example travel signals, such as vehicle speed and steering deviation, blinker confirmation signals, characteristic data of the vehicle (passenger vehicles or trucks) or navigational data for a travel path, and possibly other data.

Figure 2:
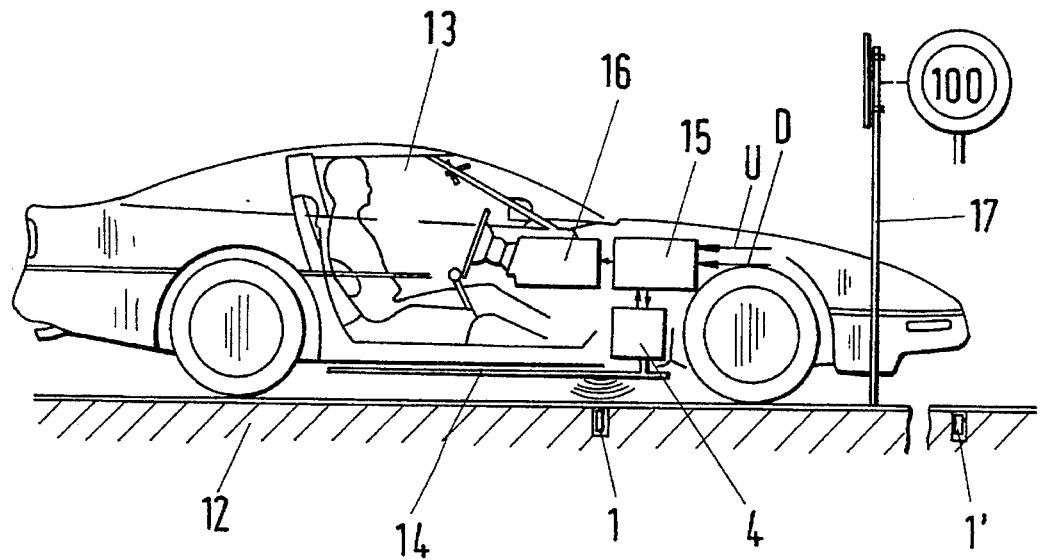
FIG. 2 is a partially cross-sectional, schematic, view of a roadway having a transponder built into pavement thereof, with a motor vehicle driving thereon receiving a traffic indication, or signal, from the transponder.

According to the embodiment of FIG. 2, the transponder 1 is built into a roadway pavement 12 near a speed limit traffic sign 17. Information corresponding to that of the traffic sign 17 is stored in the memory 8 of the transponder 1. If a vehicle 13 with a coil antenna 14 drives over the transponder 1 then energy is transferred to the transponder 1 via the coil antenna 14 so that it, the transponder, is activated and sends out its stored, or memorized, information as a digital code signal. This energy transfer can be caused by a changing magnetic field at the transponder. The transponder information is received by the coil antenna 14 so that, via the read-out device 4 and the analyzing circuit 15, the information of the traffic sign 17 is shown on the indicating device 16. Preferably, the indicating device 16 maintains this condition until the vehicle 13 drives over a further transponder 1' which corresponds to a speed limit terminating traffic sign. Via this transponder 1' the indication of the speed-limit is cleared. The driver can thereby, during the entire effective time of the speed limit, see it on the indicating device 16.

In order to protect a driver from stimulation overload due to indications of superfluous information, it can be provided that the analyzing circuit 15 monitors the respective driving speed and displays it only if a legal speed limit is exceeded.

If the traffic sign 17 is a passing-forbidden sign it can be continuously indicated, in the same manner as a speed limit indication, during its validity. It is, however, also possible to only display the mandated passing-forbidden sign if a blinker arm is manipulated in a passing (to the left) direction. As a further criteria for determining if passing is taking place, it can be determined if a driving speed is not reduced.

Correspondingly, a course-changing driving direction traffic sign can be continuously provided or can be provided only when there is a movement of steering and/or a manipulation of a blinker arm which does not correspond to a predetermined driving direction.

An indication of a distance traffic sign can, for example, be controlled by route signals of motor vehicles.

For a vehicle sign which is valid for only special vehicles, such as trucks, and not passenger vehicles, or height or weight limitations, these areas of validity, or areas of limitation, can be stored in the memory 8. Further, the vehicle-specific data can then be fed to the analyzing circuit 15. In this case, for example, a speed limit valid for a truck will not be displayed by an indicating device 16 of a passenger vehicle. Accordingly, height limitations and speed limitations will not be displayed in a vehicle that does not exceed these limitations. By these means it is achieved that the driver is not distracted by superfluous information.

Figure 4A:
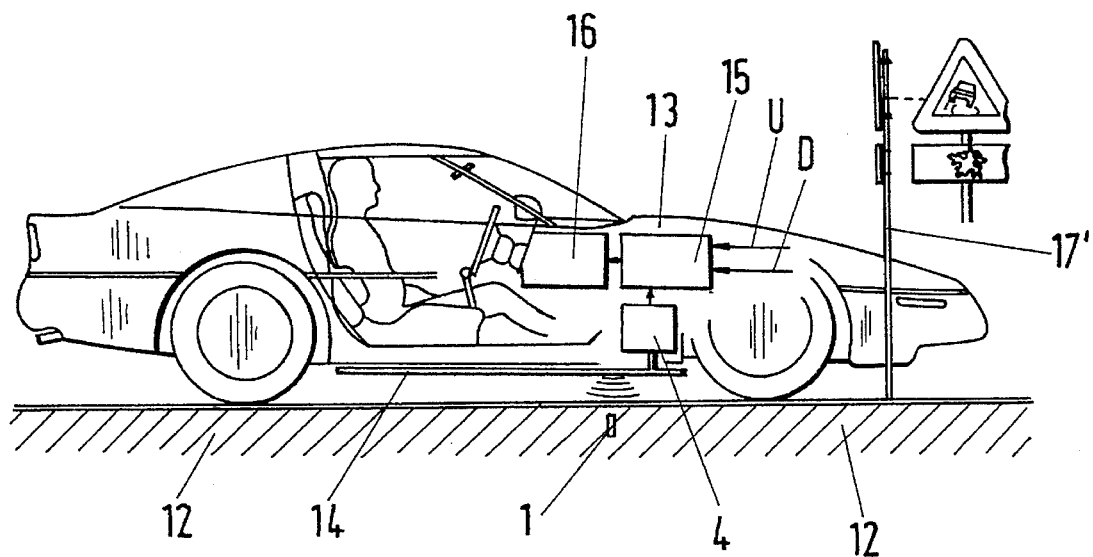
FIG. 4a is a view similar to FIG. 2 when an indication of street condition is provided.
Figure 4B:
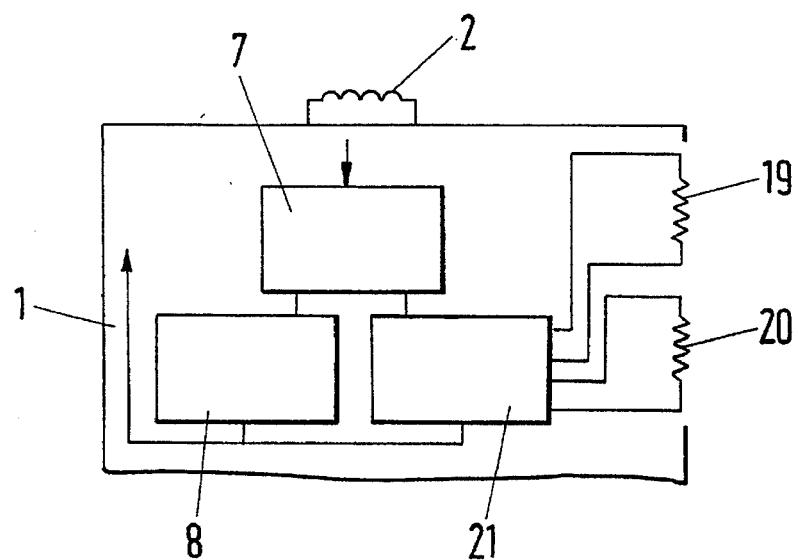
FIG. 4b is a block diagram of a portion of a transponder of this invention having a temperature sensor and a moisture sensor combined therewith.

Traffic signs are used which are valid only in particular situations, for example, speed limits which exists only when the roads are wet. With the device of this invention this additional information can also be translated into various foreign languages. An appropriate catalog for translating such additional information will, preferably, be provided in the analyzing circuit 15. This simplifies the understanding of additional information for drivers in foreign countries. It is, however, also possible for such traffic signs, which are only effective during limited additional conditions, for example "when wet", to only be displayed when the appropriate atmospheric conditions are actually present. The transponder 1 can then be provided with an appropriate sensor for monitoring an actual condition of the roadway, in a manner as is described below in relation to FIG. 4.

When the traffic sign is to be changed, the transponder arranged therewith can be disabled by destruction thereof, because, normally, it is easier to do this than to remove the transponder from the roadway pavement. For programmable transponders, the data of the memory 8 can be erased and data corresponding to a new traffic sign, can be stored in the memory 8 in a contactless manner. Read-out, or programming, devices are made available to agencies responsible for maintaining roads with which functions of installed transponders are controllable. They should have input/read-out devices available with which programmable transponders can be adapted to a new traffic situation.

There are also changing traffic signs which are controlled, according to traffic situations, from a central traffic control office. In order to adapt transponders corresponding to such changeable traffic signs the transponders are programmed over connecting cables, or through wireless signals.

To display the driving of a vehicle in a direction opposite to a mandated direction, for example on one-way streets or on limited-access highway entrances, a transponder pair is built into a roadway pavement, in series in a driving direction, with the transponders of the pair giving off different signals so that the analyzing circuit 15 can determine if the proper first transponder is first driven over, followed by the second transponder, or vice versa. If the transponder pair is driven over in an improper direction, an optical and/or acoustical warning signal is provided by the indicating device 16. A second transponder pair can also be provided in the driving direction. If also then the second transponder pair is driven over, an automatic intervention into motor electronics of the vehicle 13 can take place via the analyzing circuit 15, which can lead to a turning-off of the motor so that the vehicle 13 can no longer be driven in the improper direction. The vehicle can then only be driven from the driving area in reverse. If the transponders are driven across in the correct direction then the above mentioned condition is erased.

At the same time that the indicating device 16 provides a visible warning of the improper direction, the warning blinkers and/or the illumination of the vehicle can be turned on by the analyzing circuit 15 in order to warn other traffic participants.

Figure 3A:
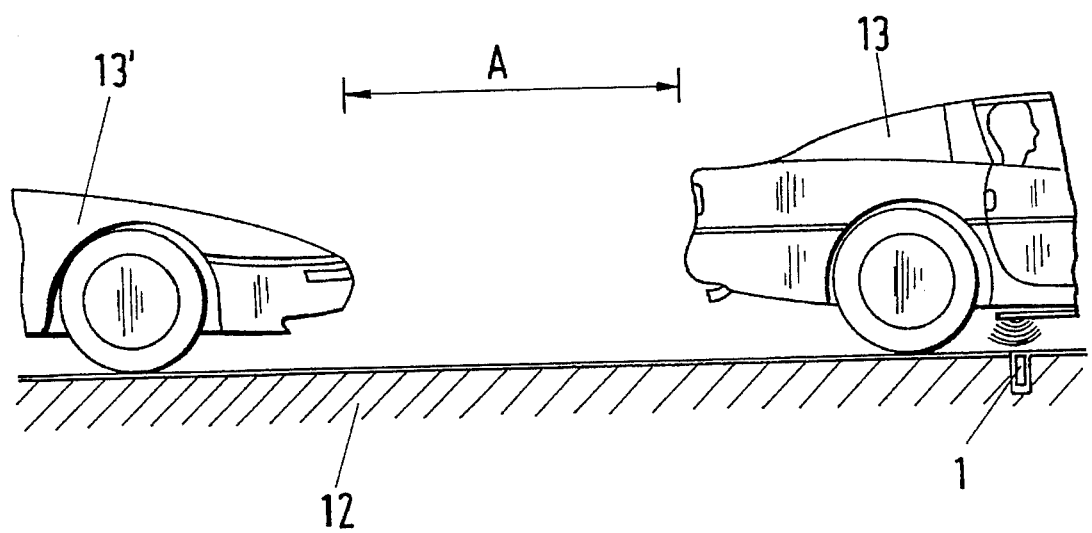
FIG. 3a is a view similar to FIG. 2 with only a segment of the receiving vehicle being shown and a segment of a following vehicle being shown when the transponder is providing a spacing warning.
Figure 3B:
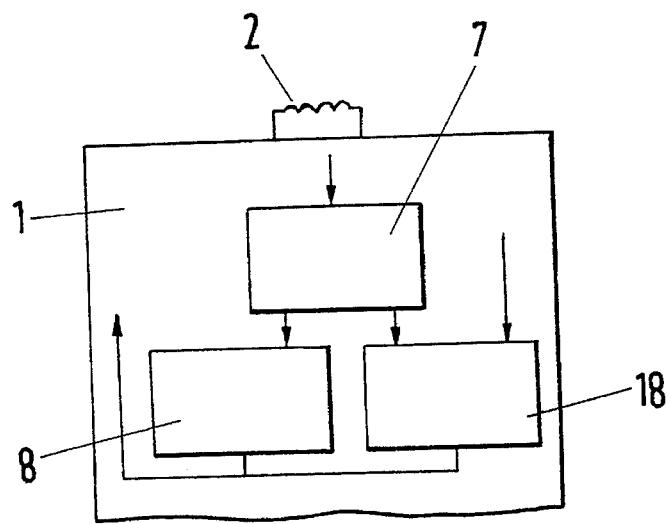
FIG. 3b is a block diagram of a portion of an embellished transponder including a counter.

Independently of, and in addition to, the above described functions of the transponder 1 that is built into the roadway pavement 12, it can also be used as a spacing warning apparatus for displaying in a following vehicle 13' a spacing A between it and a leading vehicle 13 (see FIG. 3a). The transponder 1 is provided with a counter 18 controlled by the clock circuit 6 (see FIG. 3b). When the coil antenna 14 of the leading vehicle 13 leaves the transponder 1 then the counter 18 begins to count. To do this it is powered by the voltage supply circuit 5 which has stored a remaining, or residue, energy from the transmission of the leading vehicle 13. When the following vehicle 13' drives over the transponder 1, a count corresponding to the spacing A is transmitted via its coil antenna 14 to its read-out device 4. The analyzing circuit 15 of the following vehicle 13' calculates from the transmitted count the spacing A and can also reference this to a driving speed. The spacing and/or a deviation from a minimum spacing for that speed is displayed on the indicating device 16.

The described apparatus for transferring information can also be used to display road conditions. For example, a transponder 1 used particularly for a traffic sign indicating slippery roadway (see FIG. 4a) has for this purpose a temperature sensor 19 and a moisture sensor 20, arranged at the surface of the roadway pavement 12, being coupled to the circuit of the transponder 1 via an analog-digital converter 21. If the roadway is wet or icy then the read-out device 4 receives from the transponder 1 corresponding warning information which is displayed as a warning signal by the indicating device 16.

With other data of sensors coupled to the transponder or stored in the memory 8 of the transponder 1 it is also possible to display a roughness of the roadway, a curve radius, or a curve banking, on the indicating device 16 and/or to have it operate directly on vehicle steering. For example, it is also possible for this to operate on vehicles which have a drivetrain, or gear, control.

The described transponders 1 which are set in the roadway pavement 12 are suitable also for construction of a navigation system for motor vehicles in which a predetermined route, or desired destination, is stored in a navigation apparatus of each vehicle by means of an input device. In the respective transponders, in this case, directional information and/or street names, can be stored which are read by navigational apparatus of vehicles passing over and compared with desired data.

When principles of this invention are employed, disturbing reflections of the transmittal signal from buildings or other objects, for example, from opposing traffic, passing vehicles or other radiation barriers, do not appear. Particular measures for directional radiation of the transmitted signal are unnecessary. Also, no radio-shaded areas can appear for obstructing reception of the transmitted signal.

The fixed, constructed-in-place transmitter-building elements receive the necessary energy from vehicles driving over them and send information back to the vehicles. The vehicles send the energy and receive the information.

A transponder is provided as a transmitter-building element.

The transponder provides a stabile building element which can be built into the pavement of a roadway without it being necessary that it be coupled to an energy supply. Such transponders are comparatively inexpensive and are suitable, therefore, to be deployed in large numbers with traffic signs. Extremely varied information can be fixed in the transponders or can be stored in programmable transponders.

While the invention has been particularly shown and described with reference to a preferred embodiment, it will be understood by those of ordinary skill in the art that various changes in form and detail may be made therein without departing from the spirit and scope of the invention.

The embodiments of the invention in which an exclusive property or privilege are claimed are defined as follows:

1. Apparatus for transferring information in motor vehicle traffic between a transmitter-building element of pavement forming a roadway and a receiver arranged in a motor vehicle, whereby the transmitter-building element transmits a coded information signal and said receiver of said vehicle driving over the transmitter-building element receives and analyzes the information signal and the transmitter-building element receives necessary energy to transmit the information signal from the vehicle driving over it;

wherein the transmitter-building element includes a transponder having a means for being activated to emit a digital code signal in response to a changing magnetic field, said transmitter building element being mounted at a traffic-critical location in the roadway pavement at which it can be driven over by said vehicle;

wherein the receiver has a loop antenna arranged in a floor area of the vehicle which transmits to the transponder the energy necessary for the transponder to transmit, and which receives an information signal transmitted by the transponder for guiding the vehicle;

wherein the receiver includes an analyzing circuit coupled to the antenna for analyzing the information signal;

wherein said apparatus further includes an indicating device coupled to the analyzing circuit for indicating information from the analyzed information signal in the vehicle;

wherein the information signal corresponds to a changeable traffic sign which is arranged near the transmitter-building element in the roadway pavement;

wherein the transmitter-building element includes a programmable memory with a means for automatically changing its program in response to changing the corresponding changeable traffic sign.

2. Apparatus as in claim 1 wherein the programmable memory is programmable by means of an additional transmitter.

3. Apparatus for transferring information in motor vehicle traffic between a transmitter-building element of pavement forming a roadway and a receiver arranged in a motor vehicle, whereby the transmitter-building element transmits a coded information signal and said receiver of said vehicle driving over the transmitter-building element receives and analyzes the information signal and the transmitter-building element receives necessary energy to transmit the information signal from the vehicle driving over it;

wherein the transmitter-building element includes a transponder having a means for being activated to emit a digital code signal in response to a changing magnetic field, said transmitter building element being mounted at a traffic-critical location in the roadway pavement at which it can be driven over by said vehicle;

wherein the receiver has a loop antenna arranged in a floor area of the vehicle which transmits to the transponder the energy necessary for the transponder to transmit, and which receives an information signal transmitted by the transponder for guiding the vehicle;

wherein the receiver includes an analyzing circuit coupled to the antenna for analyzing the information signal;

wherein said apparatus further includes an indicating device coupled to the analyzing circuit for indicating information from the analyzed information signal in the vehicle;

wherein there are at least two transmitter-building elements staggered along the roadway, constructed in the pavement thereof, each providing information regarding a driving direction of a motor vehicle; and wherein information signals from the at least two transmitter-building elements indicate a proper driving direction of a vehicle and the receiver gives off an alarm signal when the vehicle is driving in an opposite direction to the proper direction.

4. Apparatus as in claim 3 wherein the at least two transmitter-building elements are arranged in series in a driving direction of said vehicle along the roadway pavement.

5. Apparatus as in claim 4 wherein a leading transmitter-building element of the at least two transmitter-building elements in said driving direction erases an indication of driving direction from earlier passed transmitter-building element.

6. Apparatus for transferring information in motor vehicle traffic between a transmitter-building element of pavement forming a roadway and a receiver arranged in a motor vehicle, whereby the transmitter-building element transmits a coded information signal and said receiver of said vehicle driving over the transmitter-building element receives and analyzes the information signal and the transmitter-building element receives necessary energy to transmit the information signal from the vehicle driving over it;

wherein the transmitter-building element includes a transponder having a means for being activated to emit a digital code signal in response to a changing magnetic field, said transmitter building element being mounted at a traffic-critical location in the roadway pavement at which it can be driven over by said vehicle;

wherein the receiver has a loop antenna arranged in a floor area of the vehicle which transmits to the transponder the energy necessary for the transponder to transmit, and which receives an information signal transmitted by the transponder for guiding the vehicle;

wherein the receiver includes an analyzing circuit coupled to the antenna for analyzing the information signal;

wherein said apparatus further includes an indicating device coupled to the analyzing circuit for indicating information from the analyzed information signal in the vehicle;

wherein the transmitter-building element includes a counter which includes means for beginning a count when driven over by a leading vehicle and means for measuring a spacing of a following vehicle from the leading vehicle by means of the counter's count.

\* \* \* \* \*